UNITED STATES PATENT OFFICE.

THOMAS E. MURRAY, JR., AND JOSEPH B. MURRAY, OF BROOKLYN, NEW YORK.

ELECTRIC WELDING APPARATUS.

1,320,895.  Specification of Letters Patent.  Patented Nov. 4, 1919.

Application filed April 10, 1919. Serial No. 288,916.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Electric Welding Apparatus, of which the following is a specification.

The invention is an electric welding apparatus and method of controlling the welding current therein, more especially adapted to the use of welding currents of abnormally high ampere strength, such as are set forth in U. S. Letters Patent Nos. 1,281,636 and 1,281,637, granted to Thomas E. Murray, Jr., one of the applicants herein, October 15, 1918.

The invention consists in the construction whereby after the work is clamped between the electrodes, the motor which actuates the movable electrode is automatically stopped and a circuit established, through which an electro-magnet may be energized to exert an increased pressure upon the clamped work after the same has been heated; in the disposition of a switch having its contacts in air and a switch having its contacts immersed in oil, the said contacts being in series circuit with the welding electrodes and source of welding current, and in the various combinations and instrumentalities more particularly pointed out in the claims.

In the accompanying drawings—

Figure 1:
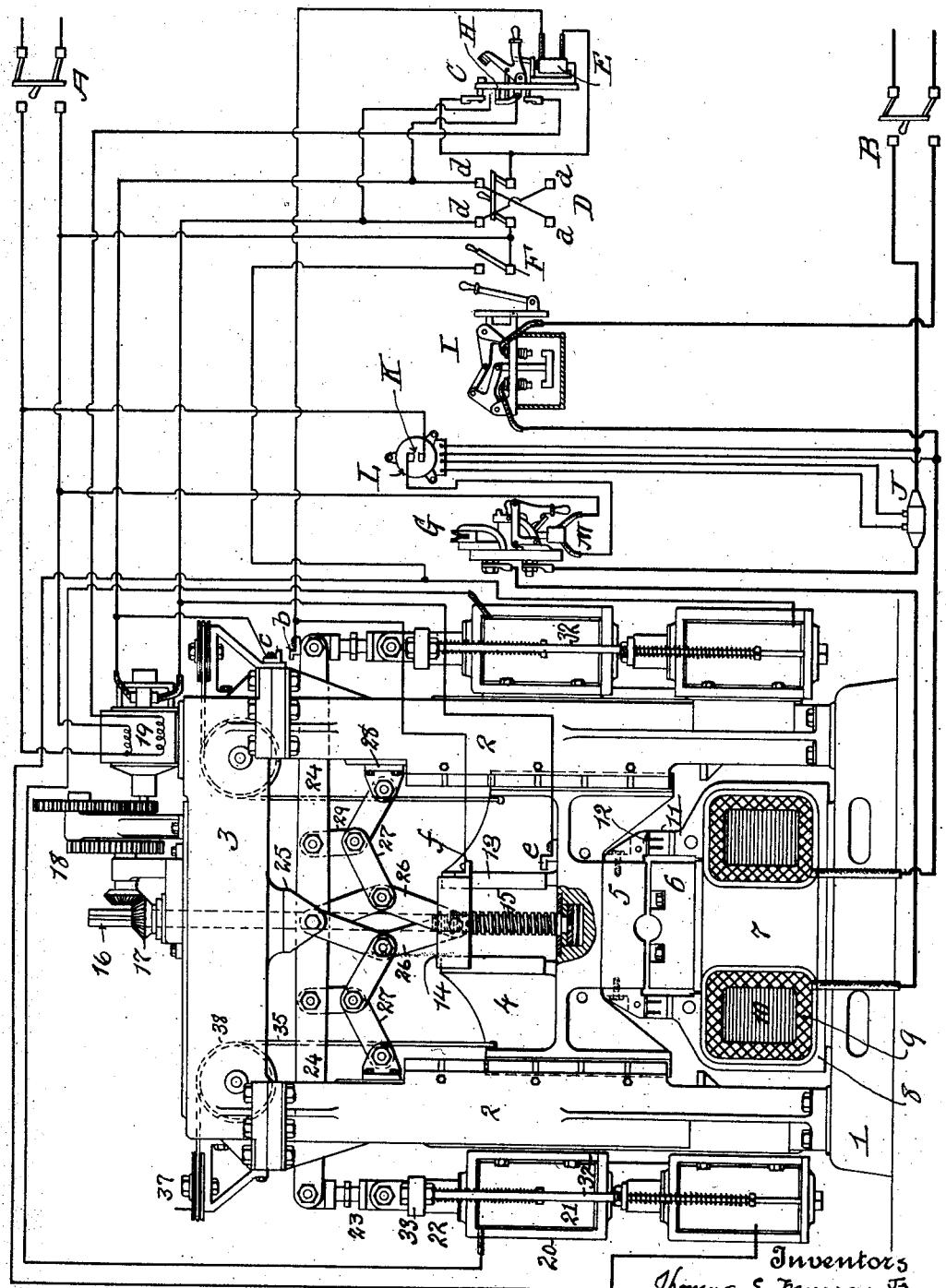
Figure 2:
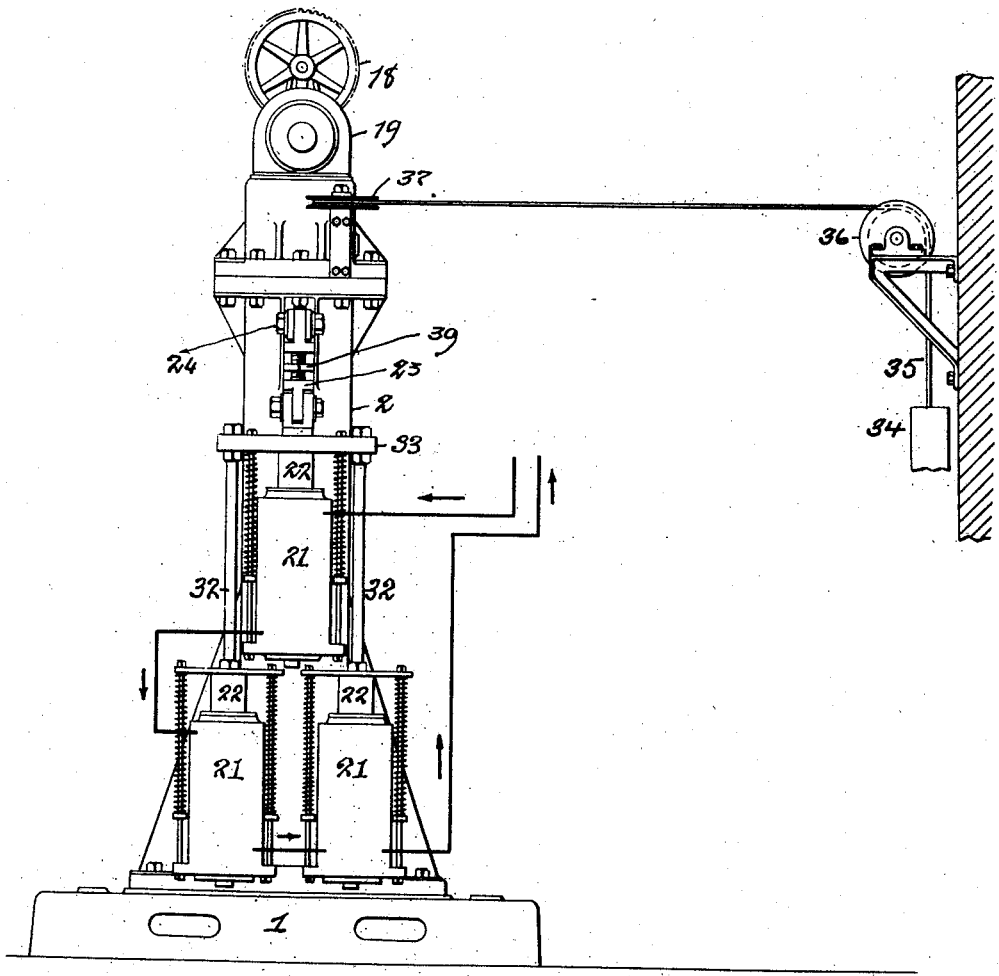

Figure 1 is a front elevation of our electric welding apparatus, showing the controlling devices connected in circuit. Fig. 2 is a side elevation of the welding machine, the controlling devices being omitted in this figure.

Similar numbers and letters of reference indicate like parts.

The welding machine which is included in our apparatus is constructed as follows:

Upon the bed 1 are upright standards 2 united at their upper ends by cross girder 3. On the inner sides of said standards are ways in which slide the cross head 4, which carries the upper electrode 5. The lower and coöperating electrode 6 is supported upon a pillar 7 which rests upon the bed 1, integral with which pillar and extending from the lower portion of the sides thereof are arms 8 which are turned upwardly and then inwardly to form loops in which are disposed the primary coil 9 of a transformer, the core 10 of said transformer being received within said coil. The pillar 7 and arms 8 form the secondary of said transformer. Upon the upper ends of arms 8 are contacts 11 which, when the upper electrode 5 is in lowered welding position, coöperate with contacts 12 on said electrode 5, the secondary circuit then including the pillar 7, arms 8, the electrodes 5, 6 and the objects to be welded which are respectively disposed in conformably shaped recesses in the opposing faces of said electrodes.

Upon the cross head 4 are vertical ways 13 which enter grooves in the edges of a nut 14 which receives a vertical screw 15 rotatably stepped on said cross head. On said screw is a vertical shaft 16 which passes through girder 3 and above said girder is keyed to a bevel pinion 17 actuated by gearing 18 supported in standards on said girder and driven by an electric motor 19, also supported on said girder.

Secured on the outer sides of standards 2 are frames 20, three on each standard, in which frames are disposed electro-magnets 21, each having a plunger armature 22. The armatures of the two lower magnets of each group are connected by rods 32, Fig. 2, to a cross bar 33, to which bar is also connected the armature of the upper magnet. Hence when energized, the magnets of each group operate unitedly. The cross bars 33 are connected by links 23 to the outer ends of levers 24, which levers pass through standards 2 and at their inner ends are pivoted to a bracket 25 depending from girder 3. To said bracket are also pivoted the pairs of toggles 26, which at their lower ends are pivoted to nut 14. To the knuckle joints of toggles 26 are pivoted toggles 27, the outer ends of said toggles being pivoted in brackets 28 on the inner sides of standards 2. The knuckle joints of toggles 27 are connected by links 29 to the levers 24.

We will now describe the controlling devices.

The switch A controls direct current and the switch B alternating current from suitable sources. C is a limit switch and D the motor control switch. The switches A, B and C are first closed, and the motor control switch D is swung downwardly to close circuit with two contacts *a*, *a*.

The result is as follows: The motor 19 is set in operation to rotate the screw 15. The weight of the magnet armatures 22 and the levers and toggles connected thereto is made sufficient to hold the nut 14 stationary, so that the effect of rotating the screw is to move the cross head 4 downwardly, thus clamping the objects to be welded between the electrodes 5, 6, and closing circuit through the contacts at 11, 12.

When the machine is constructed of large size, we may add to the resistance offered to the movement of the nut, by providing counter-weights 34 supported by cords 35 passing over fixed pulleys 36 on the wall or other support, over pulleys 37, 38 on the frame and connected to cross head 4.

When, however, the objects become clamped between the electrodes and the further downward movement of the cross head 4 is thus prevented, the nut 14 will descend for a short distance on the screw 15 and the effect of this motion, multiplied by the toggles and levers, is to raise mechanically the plunger armatures 22 of electro-magnets 21, until the circuit is closed between a contact b on one of the levers 24 and a fixed contact c on one of the standards 2. By reason of this closure, a trip coil E on the limit switch C is excited, and the switch lever being drawn down opens said limit switch and stops the motor 19. At the same time, the opening of switch C closes contacts H on the back of said switch which short circuits the rotor of motor 19, causing said rotor instantly to stop.

Conditions are now prepared for the admission of the alternating current to the welding electrodes and for energizing the electro-magnets 21 so as to cause them to press said electrodes together. The magnet pressure is effected by closing a switch F, which establishes direct current to the coils of all of the magnets. To start the weld, a switch G, the contacts of which are in air, is first closed, and then the switch I, the contacts of which are in oil. The contacts of said switches are in series with the electrodes and with the alternating current circuit including switch B. When the proper amount of energy has been consumed in the weld, the current from a current transformer J in said alternating current circuit will cause the contacts K in the wattmeter relay L to close, thus exciting a trip coil M in the switch G, which opens said switch and interrupts the welding current. The construction and mode of operation of said wattmeter relay is fully set forth in U. S. Letters Patent No. 1,230,357, granted to Harry R. Woodrow June 19, 1917, and is, therefore, not detailed here.

The pressure switch F is then opened, the limit switch C closed and the motor control switch D is swung upwardly to close the contacts at d, d. This will result in the motor 19 raising the cross head 4 until the circuit is closed between a contact e on said head and a contact f on the nut 14. The trip coil E of the limit switch C will thus be energized to open said switch C, thus stopping the motor 19. The welded work may then be removed from the electrodes, and after the oil switch I is closed and a new pair of objects to be welded are inserted in place between the electrodes, the cycle of operations is repeated.

In order to regulate the relation of the length of movement of the magnet armature to that of the movable electrode when the increased pressure is exerted, we interpose in links 23 any suitable adjusting mechanism—as, for example, screws and nuts 39, Fig. 2,—whereby the lengths of said links may be varied.

Particular attention is called to the interposition of both the switches G and I in the welding circuit and the order in which they are operated by the attendant.

In a switch having its contacts in air, the closing of the circuit through said contacts under heavy load is liable to cause destruction of or injury to the contacts, while the opening of the circuit is not attended with similiar results. On the other hand, in a switch having its contacts immersed in oil, the reverse conditions obtain. In operating the apparatus, we first close the switch G which is under no load because the oil switch I is open, and, therefore, no trouble can result. And we then close the oil switch I, the contacts of which, as above noted, are not endangered by said closing. When the operation is completed, we open the switch G first—which is safe—and then open the switch I under the resulting condition of no load.

The foregoing apparatus is at the present time in actual use making ogival pointed shells for United States Government, which shells are stamped or pressed from sheet steel in two longitudinal half sections. Said sections are disposed with their longitudinal edges in registering contact and seated in the semi-circular recesses shown in the electrodes 5, 6. Said shells are about thirty inches in length by nine and a half inches in diameter, and the welding current used has an E. M. F. of 350 volts and a strength of 15,000 amperes.

We claim:

1. An electric welding apparatus, comprising in series circuit, welding electrodes, a source of welding current of high ampere strength substantially as set forth and two independently operable switches, one of said switches having its contacts in air and the other of said switches having its contacts immersed in oil.

2. An electric welding apparatus, comprising a fixed electrode, a movable electrode coöperating therewith, the said electrodes receiving the work between them, means in direct current circuit for actuating said movable electrode, a switch having its contacts in air, actuating mechanism for said switch, a switch having its contacts immersed in oil, actuating mechanism for said switch, and an alternating current circuit including in series said welding electrodes and the contacts of both of said switches.

3. An electric welding apparatus, comprising welding electrodes, means for moving one of said electrodes to clamp the work between them, an electro-magnet, mechanism actuated by said magnet for exerting increased pressure upon the clamped work, independently operable means for closing circuit to said magnet, a switch in said circuit, and mechanism for closing said switch actuated by said movable electrode at the end of its clamping movement.

4. An electric welding apparatus, including a fixed electrode, a coöperating movable electrode, a motor for actuating the same to clamp the work, means for stopping said motor, a switch, a circuit including said motor, said stopping means and said switch, mechanism connected to said movable electrode for exerting increased pressure upon said electrodes, and independently operable means for electrically controlling said pressure mechanism; the said parts being timed and operating to clamp said work between the electrodes, automatically to close said switch and actuate said motor stopping means, and to establish circuit to said independently operable controlling means.

5. An electric welding apparatus, comprising a frame, a fixed electrode, a movable electrode coöperating therewith, the said electrodes receiving the work between them, an electro-magnet, a lever pivoted at one end to a fixed abutment on said frame, a link connecting said lever to the armature of said electro-magnet, a toggle interposed between said frame and said movable electrode, a toggle interposed between the knuckle joint of said first-named toggle and a fixed abutment on said frame, a link connecting the knuckle joint of said last-named toggle to said first-named lever between said magnet armature and the pivot of said lever; whereby upon the energizing of said electro-magnet, said electrode through said toggle mechanism is caused to press upon the work.

6. An electric welding machine, as in claim 3, further including means for regulating the extent of movement of said movable electrode with relation to the extent of movement of said magnet armature.

7. An electric welding machine, comprising a frame, a vertically movable cross head therein, an electrode carried by said cross head, a fixed coöperating electrode, a vertical screw rotatably connected to said cross head, vertical fixed ways on said cross head, a nut on said screw guided in said ways, a motor for rotating said screw, a stopping device for said motor, an electro-magnet having a vertically moving plunger armature, a lever pivoted at one end to said frame, a link connecting the opposite end of said lever to said magnet armature, a contact on said lever above said link, a fixed coöperating contact on said frame, toggle mechanism interposed between said lever and said nut, and a circuit including said contacts, said motor and said motor stopping device; the aforesaid parts being timed and operating so that said nut being held stationary by the weight of said armature, lever and toggle mechanism, the said cross head is caused to descend by the rotation of said screw until the work is clamped between said electrodes, whereupon the continued rotation of said screw causes the nut thereon through said toggle mechanism and lever to retract said magnet armature to cause the same to close circuit between said contacts and thus to operate said motor stopping device.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.